(12) United States Patent
Cappuccilli et al.

(10) Patent No.: US 12,370,780 B2
(45) Date of Patent: Jul. 29, 2025

(54) VEHICLE COMPOUND GLAZING UNIT WITH PROJECTION AREA

(71) Applicant: SAINT-GOBAIN GLASS FRANCE, Courbevoie (FR)

(72) Inventors: Michele Cappuccilli, Monschau (DE); Johannes Wolf, Aachen (DE); Andreas Nositschka, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 499 days.

(21) Appl. No.: 17/925,800

(22) PCT Filed: May 17, 2021

(86) PCT No.: PCT/EP2021/062995
§ 371 (c)(1),
(2) Date: Nov. 16, 2022

(87) PCT Pub. No.: WO2021/233827
PCT Pub. Date: Nov. 25, 2021

(65) Prior Publication Data
US 2023/0347625 A1     Nov. 2, 2023

(30) Foreign Application Priority Data
May 18, 2020   (EP) .................................... 20175151

(51) Int. Cl.
*G02B 27/01*      (2006.01)
*B32B 17/10*      (2006.01)
(Continued)

(52) U.S. Cl.
CPC .... *B32B 17/1022* (2013.01); *B32B 17/10036* (2013.01); *B32B 17/10449* (2013.01);
(Continued)

(58) Field of Classification Search
CPC .......... B32B 17/1022; B32B 17/10036; B32B 17/10449; B32B 17/10743;
(Continued)

(56) References Cited

U.S. PATENT DOCUMENTS 5,153,062 A * 10/1992 Grolig ............... B32B 17/10293
428/432
7,157,133 B2   1/2007 Moran
(Continued)

FOREIGN PATENT DOCUMENTS

DE           39 24 276 A1    1/1991
DE     10 2004 051607 A1    3/2006
(Continued)

OTHER PUBLICATIONS

International Search Report as issued in International Patent Application No. PCT/EP2021/062995, dated Aug. 23, 2021.

*Primary Examiner* — Bumsuk Won
*Assistant Examiner* — John Curtis Sipes
(74) *Attorney, Agent, or Firm* — Pillsbury Winthrop Shaw Pittman LLP (57) ABSTRACT

A vehicle compound glazing unit with first and second regions including a first pane having first and second surfaces, a second pane having third and fourth surfaces, a first thermoplastic polymer interlayer, wherein the first interlayer is arranged between the second surface of the first pane and the third surface of the second pane, and a heatable layer or coating arranged at the second surface of the first pane or the third surface of the second pane, the heatable layer or coating provided with two or more electrical contacts. The vehicle compound glazing unit also includes a diffusely reflecting structure in the second region, which diffusely (Continued)

reflects incident light directed to the glazing unit from the interior of the vehicle and having a maximum gain in the range of 0.1 to 0.8.

17 Claims, 9 Drawing Sheets

(51) Int. Cl.
| | | |
|---|---|---|
| *B60J 1/00* | (2006.01) | |
| *B60J 1/02* | (2006.01) | |
| *B60K 35/00* | (2006.01) | |
| *B60K 35/23* | (2024.01) | |
| *B60K 35/60* | (2024.01) | |

(52) U.S. Cl.
CPC .. *B32B 17/10743* (2013.01); *B32B 17/10761* (2013.01); *B60J 1/001* (2013.01); *B60J 1/02* (2013.01); *B32B 2307/538* (2013.01); *B32B 2605/006* (2013.01); *B60K 35/00* (2013.01); *B60K 35/23* (2024.01); *B60K 35/60* (2024.01); *B60K 2360/23* (2024.01); *B60K 2360/771* (2024.01)

(58) Field of Classification Search
CPC ........ B32B 17/10761; B32B 2307/538; B32B 2605/006; B32B 17/10568; B32B 17/10614; B32B 2457/20; B32B 2605/08; B60J 1/001; B60J 1/02; B60K 35/00; B60K 35/23; B60K 35/60; B60K 2360/23; B60K 2360/771; B60K 35/81; B60K 35/10; B60K 35/425; H05B 3/845; H05B 2203/013; G03B 21/62; G03B 29/00

See application file for complete search history.

(56) References Cited

U.S. PATENT DOCUMENTS

| | | | |
|---|---|---|---|
| 7,230,767 | B2 | 6/2007 | Walck et al. |
| 8,519,362 | B2 | 8/2013 | Labrot et al. |
| 2012/0224062 | A1 | 9/2012 | Lacoste et al. |
| 2015/0138628 | A1 | 5/2015 | Guiset et al. |
| 2016/0124295 | A1* | 5/2016 | Montgomery ....... G02B 3/0006 353/38 |
| 2016/0137850 | A1* | 5/2016 | Ridealgh ............ A01M 29/08 427/248.1 |
| 2017/0205701 | A1* | 7/2017 | Ide ......................... G09F 19/18 |
| 2018/0292587 | A1* | 10/2018 | Kawamoto ............ G03B 21/62 |
| 2020/0215881 | A1* | 7/2020 | Baratin .................. B60J 5/0402 |

FOREIGN PATENT DOCUMENTS

| | | |
|---|---|---|
| DE | 10 2004 050158 B3 | 4/2006 |
| EP | 2 185 966 A2 | 5/2010 |
| EP | 2 670 594 A1 | 12/2013 |
| EP | 2 856 256 A1 | 4/2015 |
| EP | 2 856 533 A1 | 4/2015 |
| EP | 2 872 328 A1 | 5/2015 |
| EP | 2 883 693 A1 | 6/2015 |
| EP | 3 063 002 A1 | 9/2016 |
| EP | 3 151 062 A1 | 4/2017 |
| EP | 3 395 908 A1 | 10/2018 |
| EP | 3 396 454 A1 | 10/2018 |
| FR | 3 054 217 A1 | 1/2018 |
| JP | 2016-009271 A | 1/2016 |
| WO | WO 03/095251 A2 | 11/2003 |
| WO | WO 2009/035783 A2 | 3/2009 |
| WO | WO 2012/104547 A1 | 8/2012 |
| WO | WO 2013/175129 A1 | 11/2013 |
| WO | WO 2013/175130 A1 | 11/2013 |
| WO | WO 2014/009663 A1 | 1/2014 |
| WO | WO 2015/063418 A1 | 5/2015 |
| WO | WO 2018/015702 A1 | 1/2018 |
| WO | WO 2018/224766 A1 | 12/2018 |
| WO | WO 2019/229381 A1 | 12/2019 |
| WO | WO 2020/020774 A1 | 1/2020 |

* cited by examiner

$\alpha \triangleq \text{Gain}/2$

VEHICLE COMPOUND GLAZING UNIT WITH PROJECTION AREA

CROSS-REFERENCE TO RELATED APPLICATIONS

This application is the U.S. National Stage of PCT/EP2021/062995, filed May 17, 2021, which in turn claims priority to European patent application number 20 175 151.8 filed May 18, 2020. The content of these applications are incorporated herein by reference in their entireties.

FIELD OF THE INVENTION

The invention is in the field of displaying information on a glazing element of a vehicle or a cover unit. More specifically, the invention is in the automotive field, but it is not restricted to this field but can be implemented in buses, railway cars, boats, airplanes or other vehicles. More specifically, the invention is related to a heatable vehicle compound glazing unit and a heatable vehicle glazing and display system, comprising a vehicle compound glazing unit and a projector for projecting an image to the glazing unit.

BACKGROUND/PRIOR ART

In this technical field, there are many patents or patent applications which are, to a certain extent, background art to the present invention.

U.S. Pat. No. 7,157,133 discloses the basic concept of diffuse reflection with embedded diffusing surface.

EP 2 185 966 discloses an element with a diffusing surface on which a reflective layer is deposited, the whole being in an envelope of the same refractive index as the diffusing element. The assembly is designated as a numerical aperture expander working in reflection, which seems functionally close to a diffuser and a transparent element in transmission. In this patent, the integration of such an element in a head-up display (HUD) projection system for generating virtual images is mentioned.

U.S. 8,519,362 B2 describes an HUD system assembled into a car. It is based on a laminated windshield where the HUD function comes from a layer of luminophore material. U.S. 7,230,767 B2 describes a display system in a car glass pane using a light emitting material projecting the image to the driver. The image is a virtual image, focused meters away from the eyes of the driver and from the windshield.

A preparation process of an HUD system integrated into a laminated glass pane is described in EP 2 883 693. The laminated glass pane comprises an interlayer having a wedge shape for avoiding ghost images. The interlayer is made from a thermoplastic foil.

US 2012/0224062 A1 discloses a head up display comprising a laser based virtual image providing system and a system for sensing a lateral road position.

Regarding the general concept of transparent glazing units which have a certain degree of diffuse reflection, there are several patent publications, e.g. EP 2 670 594, EP 2 856 256, EP 2 856 533, EP 2 872 328, EP 3 063 002, WO 2012 104 547, WO 2018 015 702, and FR 3 054 17. In these patent documents, it is, inter alia, disclosed that such diffusely reflective glazing can contain a rough internal surface and a coating provided thereon and that such glazing can be used for OLED display solutions or for projection-based display solutions.

WO 2019/229381 A1 discloses a method for manufacturing a transparent layered element having diffuse reflection property, wherein the central layer is deposited by screen printing.

In WO 2020/020774 A1 an enameled substrate for a projection screen is disclosed.

WO 2018/224766 A1 discloses an article used as a dark-colored or black projection screen, comprising two separate, diffuse-reflection diffusing elements in the form of parallel planes or plates, wherein the first diffusing element is translucent or transparent and the second diffusing element is of dark color.

In US 2015/0138628 A1 a reflective projection screen comprising a variable light scattering system is disclosed.

EP 3 396 454 A1 discloses a reflective transparent screen capable of displaying an image light projected from a projector as image to an observer who is on the same side as the projector.

EP 3 395 908 A1 discloses a transmission type screen as head-up-display for automotive applications, in which the screen is particle based.

In EP 3 151 062 A1 a video projection structure for integration into an automotive window is presented, wherein the window contains a reflection film applied on a surface having random irregularities.

JP 2016 9271 A discloses a video display system, which is equipped with detection means to detect a movement of the observer, wherein display system can be operated by the movement of the observer.

DE 10 2004 051 607 A1 discloses a device and a method for displaying a digital image onto a geometrical and photometrical non-trivial surface. In particular, the document discloses to project an image with one or more projectors onto a non-planar surface. The projection method comprises in particular a calibration with a camera connected to a control system which is adapted to control the one or more projectors for adjusting the projection of the image for each displayed pixel of the image.

WO 03/095251 A1 discloses a heatable vehicle windshield with bus bars including braided and printed portions. There is a heatable coating on a substrate The coating might be silver based. Electrical contacts supply power via bus bars. The bus bars are arranged at top and bottom of the windshield. The connection between the windshield and the coating might be by several solder bridges.

DE 10 2004 050 158 B3 discloses a transparent pane with a heatable coating. The coating is applied onto the pane. The coating comprises a metallic layer which may be from silver as well as an optional antireflective coating. Bus bars are preferentially arranged along the top and bottom edge of the windshield glazing. There might be conductor elements or bus bars extending from the bus bars towards a center line of the windshield.

It is an object of the present invention, to provide a vehicle glazing and display system and corresponding vehicle compound glazing unit, which are adapted for a broad range of applications in future mobility solutions. More specifically, it is an object to provide a heatable glazing unit having a projection area for a vehicle, in particular as windshield, and a system which makes it possible to display rich content to basically all persons which use a vehicle or at least to all those persons, which sit close to a respective glazing unit. Furthermore, a solution is required which can be implemented, to a far extent, on the basis of available technologies and which is safe, reliable and cost-efficient.

These, and further, objects are solved by a vehicle compound glazing unit and a vehicle glazing and display system according to the independent claims. Preferred embodiments of the invention are subject of the respective dependent claims.

According to a first aspect of the invention a vehicle compound glazing unit with a first region and a second region comprises
- a first pane having a first surface and a second surface, a second pane having a third surface and a fourth surface,
- a first interlayer from a thermoplastic polymer, in particular PVB, wherein the first interlayer is arranged between the second surface of the first pane and the third surface of the second pane, and
- a heatable layer or coating arranged at the second surface of the first pane or the third surface of the second pane, the heatable layer or coating being provided with two or more electrical contacts, in particular bus bars, the vehicle compound glazing unit further comprising
- a diffusely reflecting structure in the second region, which diffusely reflects incident light directed to the glazing unit from the interior of the vehicle and having a maximum gain in the range of 0.1 to 0.8, preferably between 0.3 and 0.6 and an intrinsic viewing angle $\alpha$ for a real image element generated within the glazing surface of more than 60°, in a first direction and of more than 30°, in a second direction, perpendicular to the first direction. The second region is suitable for projection of a real image with a projector.

The heatable layer is a conductive, in particular a metallic, layer. Heatable layer and electrical contacts can in particular be arranged as disclosed in WO 03/095251 A1 or DE 10 2004 050 158 B3. WO 03/095251 A1 discloses a heatable vehicle windshield with bus bars including braided and printed portions. There is a heatable coating on a substrate The coating might be silver based. Electrical contacts supply power via bus bars. The bus bars are arranged at top and bottom of the windshield. The connection between the windshield and the coating might be carried out by several solder bridges. DE 10 2004 050 158 B3 discloses a transparent pane with a heatable coating. The coating is applied onto the pane. The coating comprises a metallic layer which may be from silver. Bus bars are preferentially arranged along the top and bottom edge of the windshield glazing. There might be conductor elements or bus bars extending from the bus bars towards a center line of the windshield. There can be an optional antireflective coating on the fourth surface to minimize ghost images.

The intrinsic viewing angle $\alpha$ for a real image element generated within the plane of glazing in the second region is larger than 40°, preferably larger than 60° and more preferably larger than 70° or more in a first direction and larger than 20°, preferably larger than 30° in a second direction, which is perpendicular to the first direction. When using these intrinsic viewing angles within practical application at standard environment conditions, a practical viewing angle of larger than 60°, preferably larger than 90° and more preferably larger than 120° or more in a first direction and larger than 30°, preferably larger than 45° in a second direction, which is perpendicular to the first direction, can be achieved. The practical viewing angle is dependent of both the luminous environment and the used projector. Nevertheless, the practical viewing angle is a commonly used feature for screen specification and can be determined for chosen environment conditions related to a particular use case. For standard environmental conditions and projector specification the following values could be used:

External illuminance 2200 Lux (outside the car); internal illuminance 100 Lux (inside the car); flux from projector 3500 Lumen; Projection surface: 16:9 screen with 9" diagonal (20 cm width); the practical view angle can then be extracted from gain curve via a mathematical formula.

The practical viewing angle is studied on the basis of the contrast of the screen. The contrast of a screen is commonly defined as the luminance ratio between a white and a black picture, wherein a minimum ratio of 4.5:1 (white picture to black picture) is considered as necessary for information reading. Based on this, the practical viewing angle can be derived as the observation angle $\theta$ within the position where at least the minimum contrast of 4.5:1 is achieved.

The intrinsic viewing angle $\alpha$ of a projection screen is measured at the full width half maximum (FWHM) of the peak around the maximum value of the gain, independent of the value of the observation angle $\theta$ at the peak center. The $\theta=0°$ reference for the gain curve measurement corresponds to the specular reflection direction. Thus, the intrinsic viewing angle $\alpha$ is a property of the screen and not dependent on environmental luminance and projector specification. Thus, as the maximum of the gain curve often occurs at $\theta=0°$, the intrinsic view angle can also be defined in this case as twice the observation angle $\theta$ at the position of the gain curve where the half maximum width of the gain curve is achieved.

The viewing angle (intrinsic and practical) shall be maximized as large viewing angles are necessary to ensure that all passengers of a vehicle can clearly see the projected content at the same time independent of the seat occupied by a person. However, with a given screen total reflectivity, a compromise between a high peak gain and a large viewing angle has to be found. The vehicle glazing according to the invention provides such a good compromise between peak gain and viewing angle.

Combined with the directions of the vehicle coordinate system, the first direction and the second direction define the horizontal plane and the vertical plane which cross the eyes of two viewers, e.g. driver and front-passenger.

In a preferred embodiment of the invention, the transparent screen of the vehicle glazing has a maximum gain between 0.1 and 0.8 and a practical viewing angle superior to 60° in one direction and larger than 30° in the other one. Typically, for the practical viewing angle values between 120° to 150° in horizontal plane and between 30 and 180° in vertical plane are derived. Within the intrinsic angle definition an intrinsic viewing angle superior to 40°, more preferably superior to 60°, even more preferably between 70° and 150°, in horizontal plane and between 20° and 180°, preferably between 30° and 180°, in vertical plane is derived. Vertical plane and horizontal plane are defined within the assembly situation of the vehicle glazing within the car body.

Thanks to the mentioned practical and intrinsic viewing angles, all the occupants in the vehicle can see the display when the projector is on. According to a further aspect of the invention, the displayed image is a real image. A real image differs from a virtual image concerning the plane of focus. For virtual images, the plane of focus has a certain distance to the projection screen, e.g. one meter or up to several meters. In contrast to this for real images the plane of focus is near to the screen. Preferably, the plane of focus for a real image according to the invention has a maximum distance of 30 cm to the projection screen.

When the projector is off, the glazing is optically similar to a traditional glazing, maintaining transparency with a slightly higher haze value. A typical haze value for such a glazing is between 1% and 6%, preferably between 2.5% and 4.5% measured according to the standard ASTM D 1003. The haze measures the fraction of transmitted light that is deviated from the straight path with an angle larger than 2.5°. High haze values correspond to a loss of contrast of the image projected on the screen. Within the given range of low haze values, a good transparency of the screen is obtained.

According to a further preferred aspect, the diffusely reflecting structure within the glazing unit has a transmission of visible light of higher than 60%, preferably of 70% or more, for example 80% or more. These transmission values (also referred to as global luminous transmission TO quantify the ability of the diffusely reflecting structure to transmit light of wavelength between 400 nm to 800 nm, which is the range of the spectrum visible to human eye. For those measurements, no distinction between diffused light and non-diffused light has to be made. Nevertheless, the technology according to the invention is also applicable to glazing in which a lower light transmission is desired. The screen ensemble of the invention can also be used for side windows, back windows or in glass roofs for vehicles, which may comprise tinted glass or plastic components and have an overall transmission of visible light below 30%. Such an application is of particular interest in combination with autonomous driving technology. In this case, the roof could for example be used as entertainment screen.

To measure the gain and determine suitable viewing angles of a transparent screen, one has to measure the luminance of the screen as a function of the observation angle with a projector illuminating the screen with a normal incidence (0°). The luminance of an ideal screen (Lambertian reference called Spectralon) is measured under the same conditions. An ideal screen is defined as a screen whose luminance does not depend on the projection or observation angle and whose reflectivity is 100%. The Lambertian reference screen is a surface perfectly obeying Lambert's cosine law saying that the luminous intensity observed from an ideal diffusely reflecting surface is directly proportional to the cosine of the angle between the direction of the incident light and the surface normal. The human eye can only recognize the luminance, which is a measure of luminous intensity per unit area of light travelling in a given direction, and describes the amount of light that is reflected from a particular area. Thus, a Lambertian surface with ideal diffuse reflection is seen by the human eye as showing the same luminance and brightness independent of the observation angle from which it is viewed. Experimentally an ideal Lambertian diffuser is accessible by commercially available reference materials known as "Spectralon", which is made of sintered polytetrafluoroethylene (PTFE). To retrieve the gain of the screen at each observation angle, the ratio between the screen luminance and the ideal screen luminance is calculated. The peak gain of the screen is the maximum gain value reachable for the screen. The maximum gain (also referred to as peak gain) is often measured at 0° but some specifically designed screen may have their maximum gain at other observation angles. It is to be noted that for a transparent screen, the value at 0° may not be measureable because of the hot spot (specular reflection of projector light on the external flat glazing surface) and is therefore extrapolated from gain at small angle.

Figure 5:
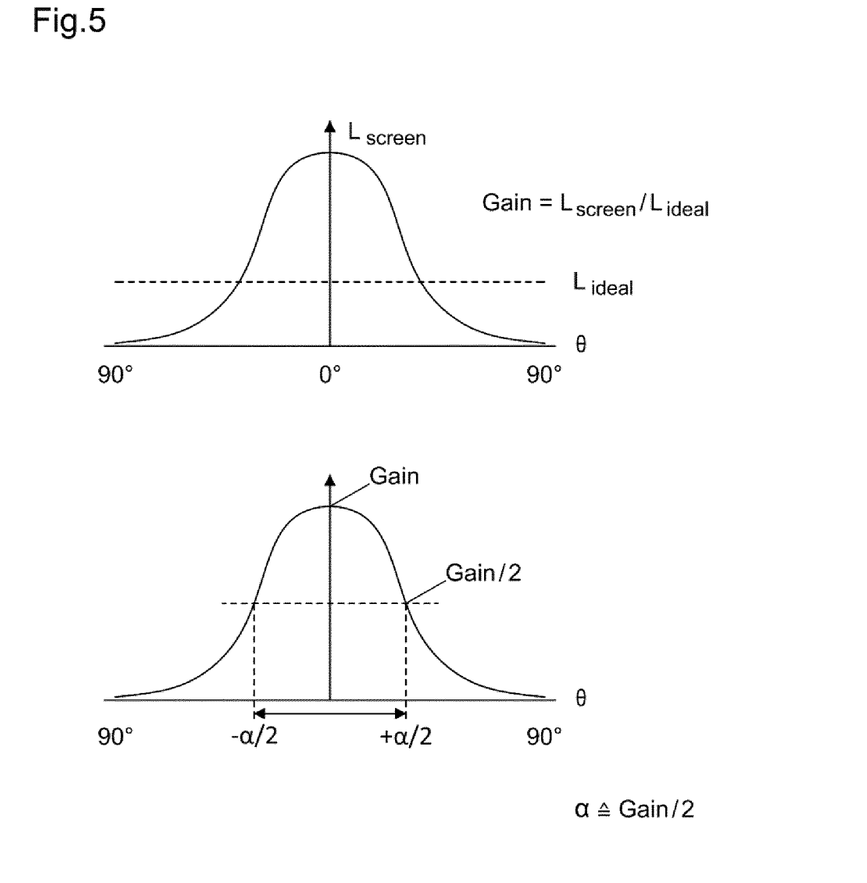

Preferred intrinsic viewing angles are defined from the gain as being within the full width half maximum of the gain curve (see FIG. 5). This definition is an intrinsic one. The gain denotes the luminance of the projection screen relative to the luminance of an ideal screen, which is a perfect Lambertian diffuser.

An alternative, more practical, definition of the viewing angle would be to define a practical viewing angle as the observation angle where the contrast is lower than 4.5:1, but such definition depends on observation and illumination conditions and projector. Thus, the intrinsic definition of viewing angles, being within the full width half maximum of the gain curve, is preferred. The gain curve can be determined as already described and has for example the shape of a Gaussian curve.

The inventors detected that that not only observation angles inferior to the half of the intrinsic view angle (i.e. within the full width half maximum of the gain curve) are suitable for practical application of the transparent screens. Adequate observation results can be achieved under observation angles inferior to the half of a practical view angle in the range of 120° to 180° within horizontal plane, preferably 120° to 150° within horizontal plane, and 30° to 180° within vertical plane.

To achieve a sufficient contrast, the projector should have an output flux higher than 1000 Lumen, better higher than 3000 Lumen, ideally between 2000 and 10'000 Lumen. The best projector flux values have to be chosen depending on the environmental conditions.

In an embodiment the first region is located in the middle of the glazing unit and the second region is located at an outer region of the vehicle compound glazing unit, surrounding partially or completely the first region, in particular wherein the second region is located along to opposing edges of the vehicle compound glazing unit. The electrical contacts or bus bars might be arranged in the second region along opposing edges of the glazing unit or in the first region along opposing edges.

In particular, the first region comprises a type A viewing region of a windshield in accordance with ECE R43, wherein the second region is exclusively located in a type B viewing region of a windshield in accordance with ECE R43.

In an embodiment, the first pane is supposed to be arranged as outer pane and the second pane is supposed to be arranged as inner pane, wherein each of the first pane and second pane is made from glass or plastic.

In an embodiment, the diffusely reflecting structure is a rough surface area of the third surface with a reflective coating.

The reflective coating can either fully cover the third surface or only cover the rough surface area of the third surface.

In another embodiment the diffusely reflecting structure is a rough surface area of the second surface with a reflective coating.

The reflective coating can either fully cover the second surface or only cover the rough surface area of the second surface.

In a particularly preferred embodiment the heatable layer or coating and the reflective coating are implemented as a single heatable reflective coating and not as two separate layers or coatings.

Suitable heatable reflective coatings are known to the skilled artisan. Suitable heatable reflective coatings are for example disclosed in DE 3924276 A1.

Thus the invention also relates to a vehicle compound glazing unit with a first region and a second region comprising
    a first pane having a first surface and a second surface, a
        second pane having a third surface and a fourth surface,
    a first interlayer from a thermoplastic polymer, in particular PVB, wherein the first interlayer is arranged between the second surface of the first pane and the third surface of the second pane, and a diffusely reflecting structure at the second surface of the first pane or the third surface of the second pane in the second region, which diffusely reflects incident light directed to the glazing unit from the interior of the vehicle and having a maximum gain in the range of 0.1 to 0.8, preferably between 0.3 and 0.6 and an intrinsic viewing angle α for a real image element generated within the glazing surface of more than 60°, in a first direction and of more than 30°, in a second direction, perpendicular to the first direction, wherein the diffusely reflecting structure is a rough surface area of the second surface or the third surface with a heatable reflective coating, the heatable reflective coating being provided with two or more electrical contacts, in particular bus bars.

The second region is suitable for projection of a real image with a projector.

In an embodiment, the vehicle compound glazing unit further comprises a second interlayer and a third interlayer. The second interlayer comprises the diffusely reflecting structure and a transparent region. The third interlayer is made from a thermoplastic polymer. The second interlayer is sandwiched between the first interlayer and the third interlayer.

The second interlayer might comprise a polyethylene (PE), polyethylene terephthalate (PET), cellulose triacetate (TAC), polyvinyl butyral (PVB), polymethyl methacrylate (PMMA) or polycarbonate sheet.

Such sheets are basically commercially available or can be manufactured upon request of the manufacturer of the vehicle compound glazing unit, tailored to the specific optical requirements according to the invention.

In an alternative embodiment, a rough glass sheet can be used instead of the rough plastic film. This has the advantage that a glass sheet can be integrated in standard lamination processes.

The diffusely reflecting structure may comprise nanoparticles or microparticles, or a random nanostructure or a random microstructure.

More specifically, the nanoparticles or microparticles are silica or polymer or liquid crystal particles. Metal or metal oxide particles can also be used. More specifically, the nanoparticles or microparticles can have spherical shape and/or are transparent or translucent.

Plastic sheets with a diffusely reflective coating comprising titanium oxides $TiO_x$ particles or silver particles as well as plastic sheets with an organic diffusely reflective coating comprising cholesteric liquid crystals have turned out to be especially suitable for the screen applications according to the invention. Most preferably the diffusely reflective plastic sheet contains liquid crystal particles, which are oriented within a matrix.

With these kind of coated plastic sheets a target maximum gain in the range of 0.1 to 0.7 and an intrinsic viewing angle of more than 60° in a first direction and of more than 30° in a second direction can be obtained.

In one preferred embodiment of the invention the diffusely reflecting structure comprises a rough surface area of the second interlayer with a heatable reflective coating.

Vehicle compound glazing unit is preferentially one of a glass roof, a windshield, a side window or a back window.

According to a second aspect of the invention a vehicle compound glazing system comprises a vehicle compound glazing unit as described above and at least one projector for projecting an image in the second region of the vehicle compound glazing unit to generate a real image in the plane of the glazing unit.

The projector may be suitable to be arranged in the dashboard and/or at the roof of the vehicle.

In an embodiment the vehicle compound glazing system comprises at least two projectors and a projector control unit connected to the at least two projectors and adapted to calibrate the projection of the image on a pixel base.

As the available distance between the projector and the glazing, in the orthogonal direction to the glass surface (projection distance), is usually between 2 cm and 60 cm, preferably between 7 cm and 40 cm, a preferential option is to use a short-throw projector. The throw ratio (size of the image/distance between projector and screen) is usually larger for short-throw projectors. In a short-throw projector, there is often a folding optics so that the projector image can be displayed in a plane that is perpendicular to the output lens. The projector may be a projector having a conventional lamp, a LED or a LASER as illumination means.

The system may comprise three, four, five, six, seven, eight or more projectors. The projectors are preferentially connected with a projector control unit which controls the projectors such that a combined image is displayed for the two or more projectors. In particular, the projector control unit comprises a camera for the calibration of the combined image such that a single image seems to be projected.

In a further embodiment, vehicle compound glazing system may further comprise a HUD display and projector.

The above-referenced generation of hot spots in the glazing unit can, to a certain extent, be suppressed by a suitable arrangement of the respective (inner and outer) surfaces of the glazing unit and, in particular, of the diffuse reflective sheet coating or surface, respectively. In a preferred embodiment, the projectors are arranged such that a possible hot spot is located above a frame in which the projectors are arranged. By such an arrangement, a possible generated hot spot is not visible from a seating position inside the vehicle. As an additional means for suppressing the hot spots at least one local blind can be arranged close to the output lens of the projector, in a suitably pre-defined position.

Additionally or alternatively if the incident light at the glazing unit is polarized, in particular p-polarized, it can be suppressed when the incident angle is near to the Brewster angle.

The image projected on the transparent screen is due to diffuse reflection. The reflection of a glazing is defined as diffuse reflection when incident radiation on the glazing with a given angle of incidence is reflected in a plurality of directions. Specular reflection occurs when incident radiation on the glazing with a given angle of incidence is reflected with an angle of reflection equal to the angle of incidence. Likewise, transmission is defined as specular when incident radiation with a given angle of incidence is transmitted with an angle of transmission equal to the angle of incidence. However, to keep transparency on the whole glazing, the inner face and outer face of the glazing are flat and therefore induce specular reflection from the projector beam. To achieve the experience, the light reaching the eye of the vehicle passengers should be given by the "diffuse reflection" of the projected image on the glass. The specular reflection on the inner and outer face of the glazing should be avoided. The specular reflection is also referred to as "hot-spot", which glares the observer when it is directed to the viewer. The direction of the hot-spot is available via the law of reflection saying that the angle of reflection equals the incidence angle. To avoid glaring the viewer by the hot-spot, the hot-spot and the observation direction of all passengers of the vehicle show preferably an angle distance of at least 5°, more preferably at least 10°, most preferably at least 20°.

The projector may be suitable to be arranged in the dashboard or at the roof of the vehicle.

Embodiments and aspects of the invention are illustrated in the drawings. In the drawings show FIG. 1a, b a schematic view of a vehicle glazing and display unit according to an embodiment of the invention, FIG. 2a-i alternative schematic cross sections of a vehicle glazing and display unit of the embodiment according to FIG. 1a, FIG. 3a-c schematic view of possible arrangements of the vehicle glazing and display system, FIG. 4a, b some configuration examples for windshields with projector arrangements and FIG. 5 an illustration for explaining definitions of the term "gain" in the context of the invention FIG. 1a shows an exemplary vehicle glazing and display unit 2. The vehicle glazing and display unit 2 might be a windshield of a car. The vehicle glazing and display unit 2 comprises a first region 4 and a second region 6. The first region 4 is located in the middle of the vehicle glazing and display unit 2 and the second region 6 is located in the upper region, marked with 6a, and lower region, marked with 6b, of the vehicle glazing and display unit 2. The second region 6 is provided with a diffusely reflecting structure. Bus bars 8 might be provided in the second region 6.

Figure 1A:
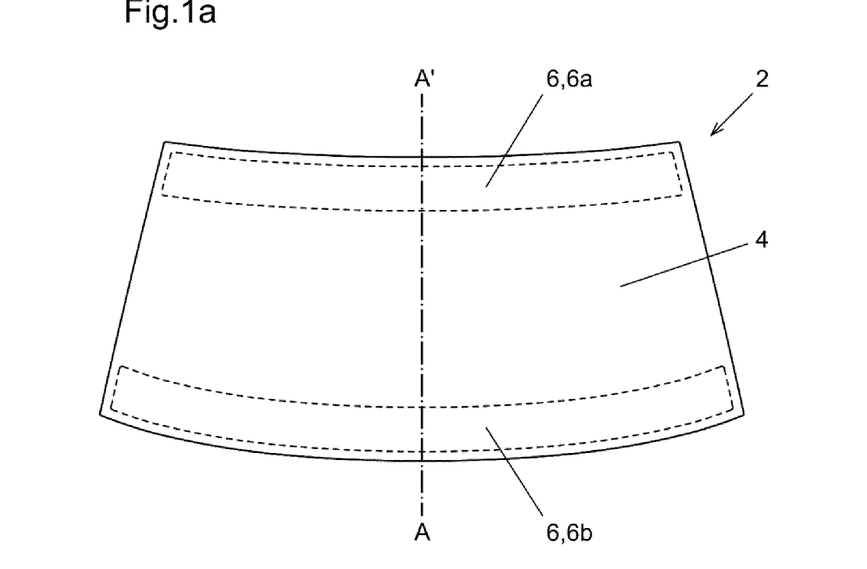
Figure 1B:
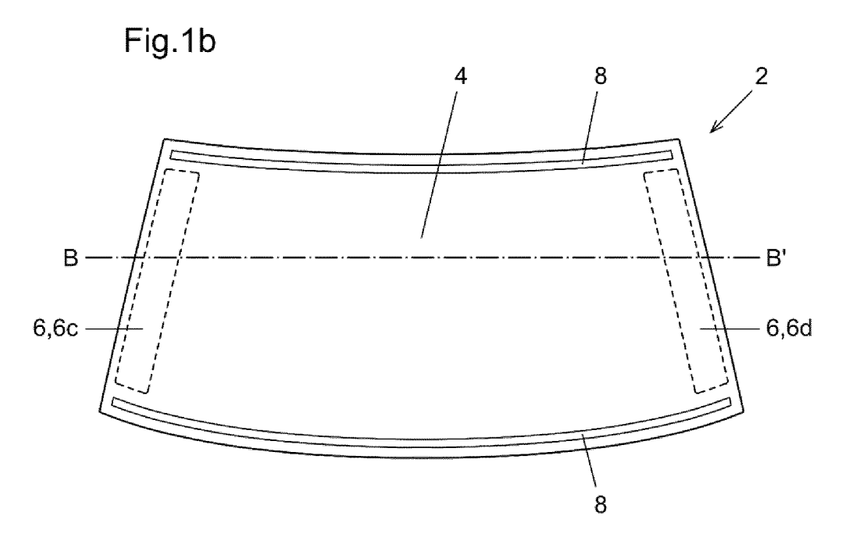

FIG. 1b shows an alternative vehicle glazing and display unit 2. The vehicle glazing and display unit 2 might as well be a windshield of a car. The second region 6 is located in an outer region of the vehicle glazing and display unit 2 on the right side, marked with 6d, and left side marked with 6c, of the first region 4. Bus-bars 8 are located at the top and bottom side of region 4, so the bus bars and the second regions are arranged along different facing edges of the vehicle glazing and display unit 2.

Figure 2A:
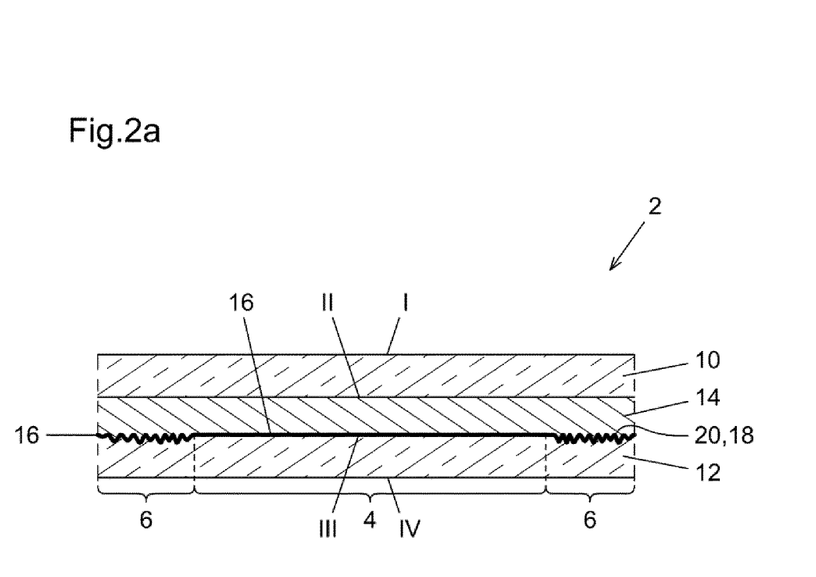

FIG. 2a-i show different embodiments of a cross-section of the above vehicle glazing and display unit. 2 along A-A' of FIG. 1a meaning from bottom to top through the windshield. FIG. 2a, c, d, e, g, h, i apply as well to a horizontal cut B-B' in the middle of FIG. 1b. The vehicle glazing and display unit 2 comprises a first pane 10 with a first surface I and a second surface II and a second pane 12 with a third surface III and a fourth surface IV. The first pane 10 and the second pane 12 are a glass or plastic pane and can be for example 2.1 mm thick. Between the second surface II of the first pane 10 and the third surface III of the second pane 12, there is a first interlayer 14 being a foil from a thermoplastic polymer. This first interlayer 14 has a flat shape with a thickness of for example 0.76 mm in FIGS. 2a, 2c, 2d, 2e, 2g, 2h and 2i, while it has a wedge shape in FIGS. 2b and 2f, where it is designated as 14a. The wedge angle φ is located in the A-A' plane of FIG. 1a resp. in a plane vertical to B-B' of FIG. 1b. This first interlayer 14 is located at the second surface II of the first pane 10, which is preferably an outer pane.

FIG. 2a shows an embodiment, wherein the third surface III of the second pane 12 is provided with the diffusely reflecting structure 20 in the second region 6 and with a flat surface in the first region 4. The diffusely reflecting structure 20 is a surface structuring of the glass or plastic pane with a reflective coating 18. The third surface III is partially or completely coated with the reflective coating 18, which might be a for example a visible light and IR-reflective coating. Thus, the third surface is either completely coated with the reflective coating 18 or only the structured area of the third surface III is coated with the reflective coating 18. Sandwiched between the reflective coating 18 and the first interlayer 14, there is a heatable layer 16, in particular a metallic, e.g. silver based layer.

Figure 2B:
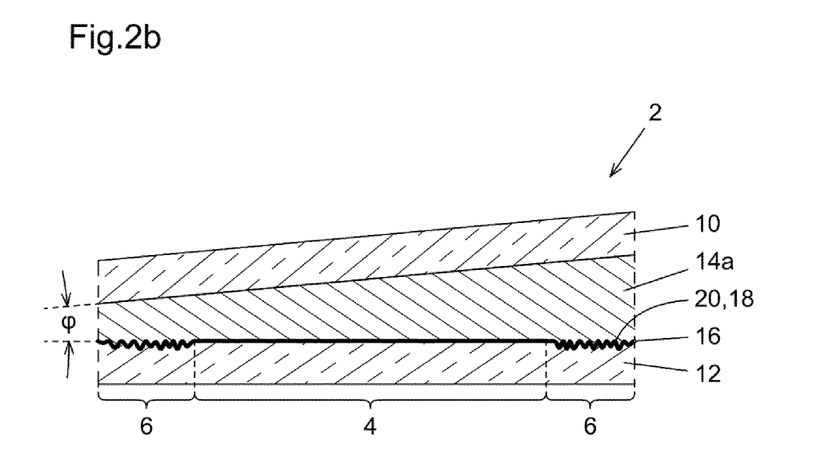

FIG. 2b differs from FIG. 2a by the wedge shape first interlayer 14a.

Figure 2C:
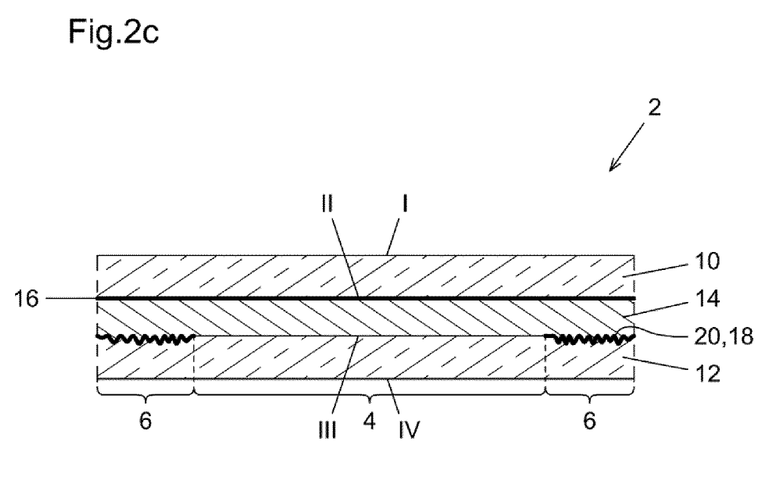

FIG. 2c shows an embodiment, where the heatable layer 16 is sandwiched between the second surface II of the first pane 10 and the first interlayer 14. The reflective coating 18 is therefore adjacent to the interlayer 14.

Figure 2D:
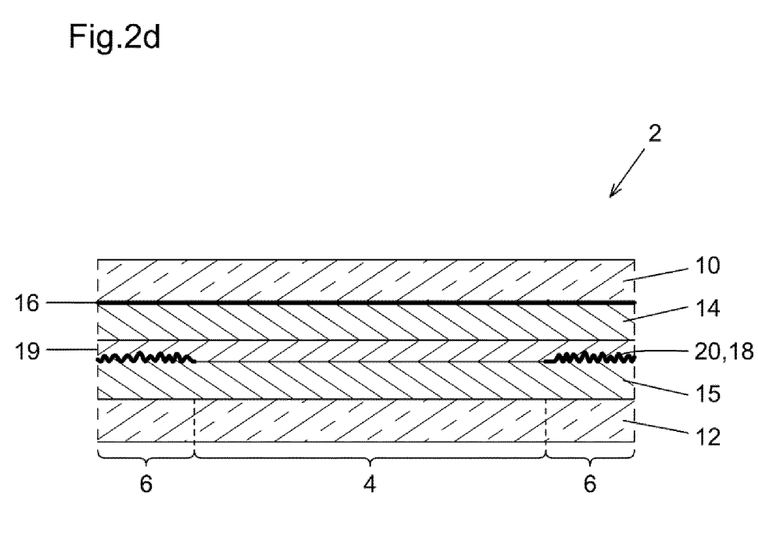

FIG. 2d shows an embodiment comprising a second interlayer 19 and a third interlayer 15. The second interlayer 19 is sandwiched between the first interlayer 14 and the third interlayer 15 and where the heatable layer 16 is sandwiched between the second surface II of the first pane 10 and the first interlayer 14. The third interlayer 15 is a thermoplastic layer, which can be made from the same material as the first interlayer 14. The second interlayer 19 comprises the diffusely reflecting structure 20 only in the second region. The diffusely reflecting structure is depicted with a rough surface. However, the reflecting structure might additionally or alternatively comprise nanoparticles or microparticles. The second interlayer 19 might comprise a PE, PET, TAC, PVB, PMMA or polycarbonate sheet.

Figure 2E:
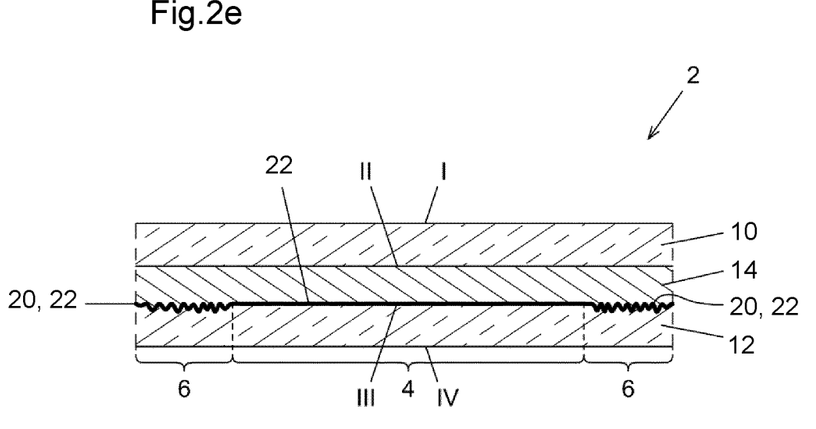

FIG. 2e shows an embodiment wherein the third surface III of the second pane 12 is provided with the diffusely reflecting structure 20 in the second region 6. In the first region 4 the third surface III of the second pane 12 is flat. In the embodiment shown in FIG. 2e the diffusely reflecting structure 20 comprises a surface structuring of the second pane 12 and a heatable reflective coating 22. The third surface III is completely coated with the heatable reflective coating 22.

Figure 2F:
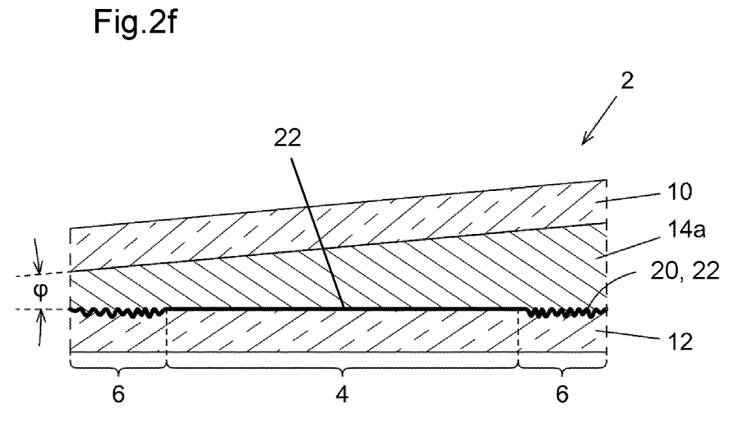

FIG. 2f differs from FIG. 2e only by the wedge shape first interlayer 14a.

Figure 2G:
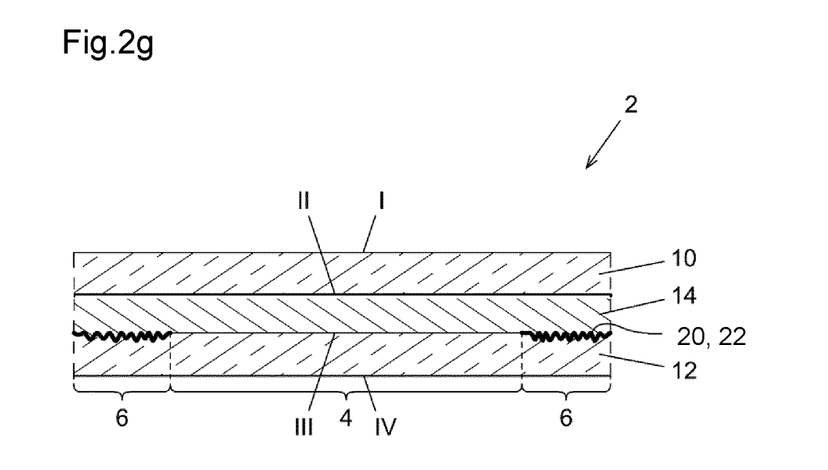

FIG. 2g shows an embodiment wherein the third surface III of the second pane 12 is provided with the diffusely reflecting structure 20 in the second region 6. In the first region 4 the third surface II of the second pane 12 is flat. In the embodiment shown in FIG. 2g the diffusely reflecting structure 20 comprises a surface structuring of the second pane 12 and a heatable reflective coating 22. The third surface III is coated with the heatable reflective coating 22 only in the structured area of the third surface III, i.e. only in the second region 6.

Figure 2H:
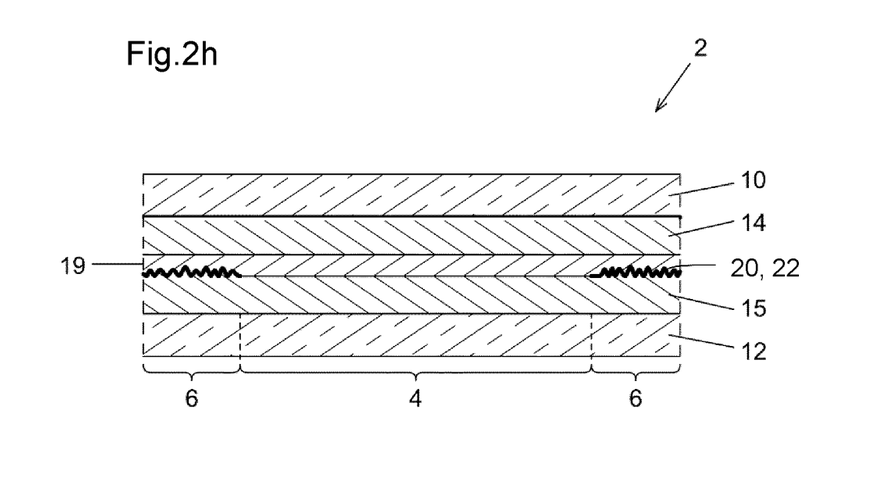

FIG. 2h shows an embodiment comprising a second interlayer 19 and a third interlayer 15. The second interlayer 19 is sandwiched between the first interlayer 14 and the third interlayer 15. The third interlayer 15 is a thermoplastic layer, which can be made from the same material as the first interlayer 14. The second interlayer 19 comprises the diffusely reflecting structure 20 only in the second region 6. In the embodiment shown in FIG. 2h the diffusely reflecting structure 20 comprises a surface structuring of the second interlayer 19 and a heatable reflective coating 22. The heatable reflective coating is only located in the second region 6. The second interlayer 19 might comprise a PE, PET, TAC, PVB, PMMA or polycarbonate sheet.

Figure 2I:
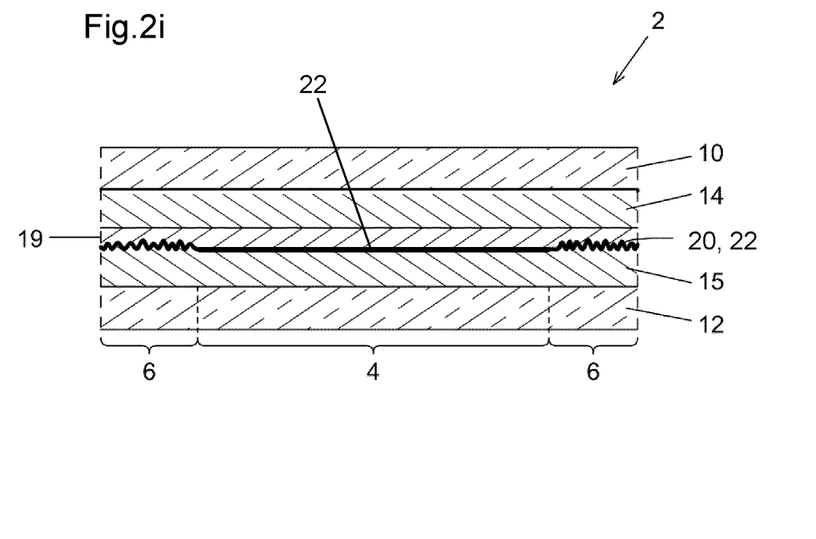

FIG. 2i shows an embodiment which differs from FIG. 2h only in that the heatable reflective coating 22 fully covers the surface of the second interlayer 19 which faces the third interlayer 15.

Figure 3A:
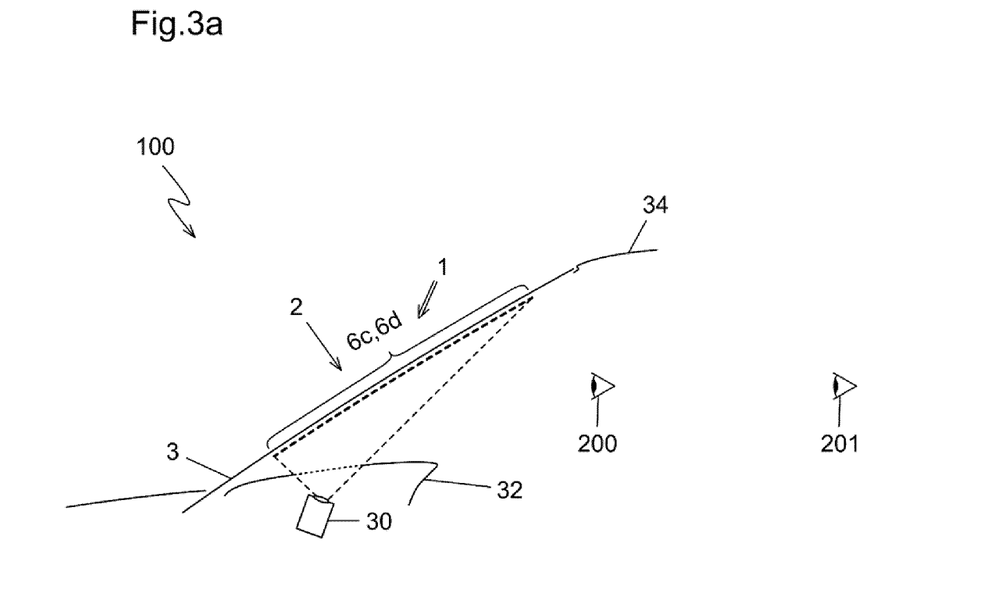
Figure 3B:
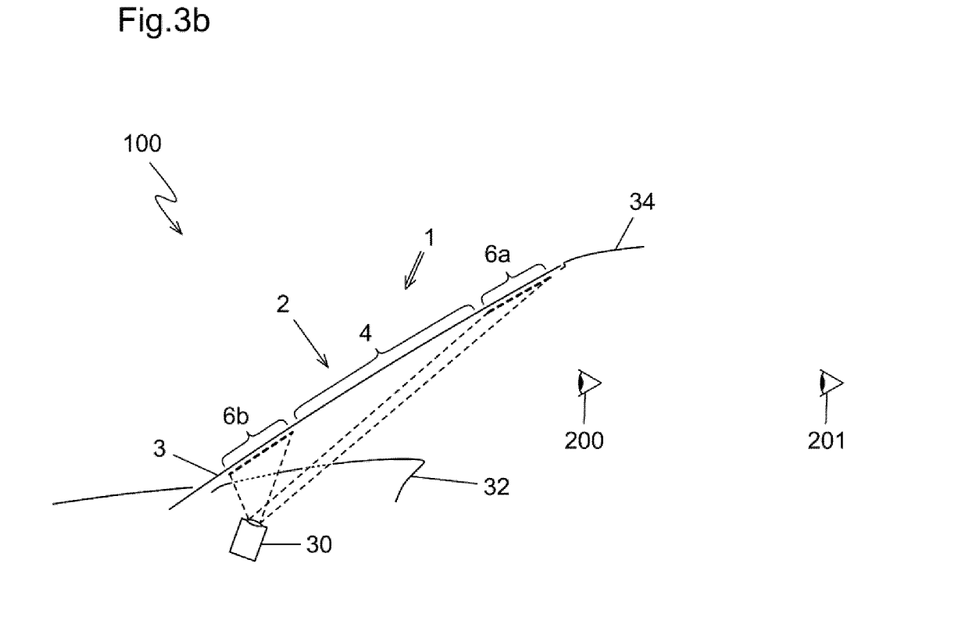
Figure 3C:
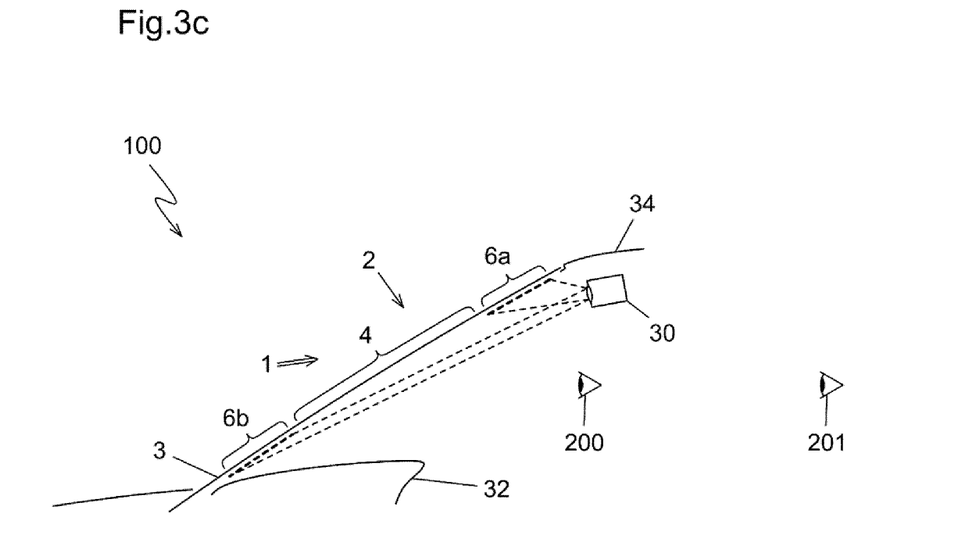

FIG. 3a to FIG. 3c show a vehicle 100 with a vehicle glazing and display system 1. The vehicle glazing and display system 1 comprises a vehicle glazing and display unit 2, which is in the depicted case a windshield 3. The vehicle glazing and display system 1 further comprises a projector 30. The projector 30 projects a real image into the second region 6. The projector 30 might be located in the dashboard as depicted in FIG. 3a and projects a single image onto a region 6c or 6d as shown in FIG. 1b or two image onto a region 6a and 6b as depicted in FIG. 1a. Alternatively to FIG. 3b the projector might be located at the roof 34 as depicted in FIG. 3c. The embodiments shown in FIG. 3b and FIG. 3c might as well be combined with one projector located at the roof 34 and one projector located in the dashboard. The image of the projector is visible for a first occupant 100, which might be the driver as well as for a second occupant 201.

Optionally, there might be several projectors 30, which might be as well located in the dashboard as at the roof of the vehicle. In case of several projectors, a projector control unit is preferably connected to the at least two projectors and which is adapted to calibrate the projection of the image on a pixel base.

Figure 4A:
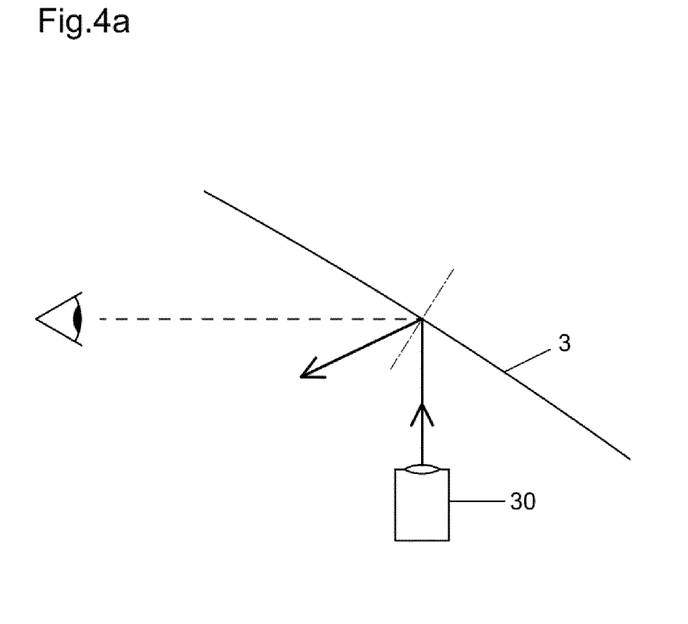
Figure 4B:
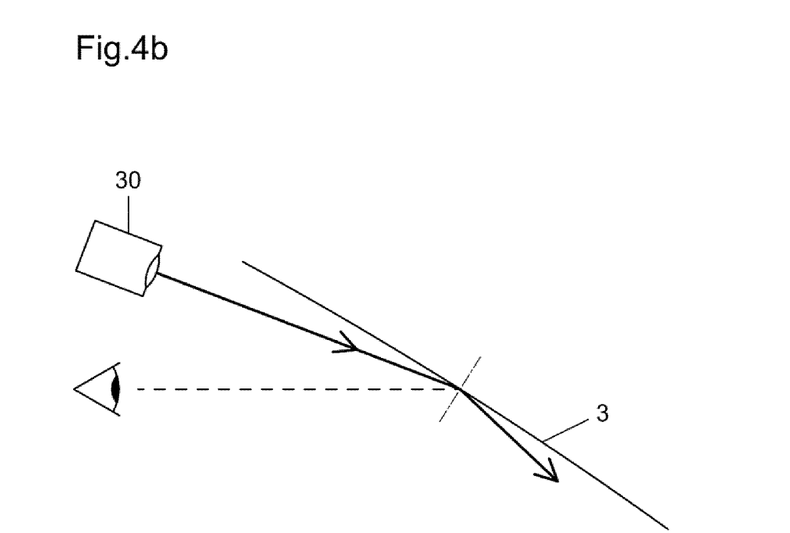

FIGS. 4a and 4b show two possible arrangements of the projector 30 relative to the windshield 3, as already explained further above. It can be recognized that in the arrangement of FIG. 4a, where the projector is arranged below the windshield and emits its light in a vertical direction, the hot spot direction can be within the angle of view of passengers inside the vehicle, whereas this is almost excluded in the arrangement of FIG. 4b where the projector is arranged below the roof of the vehicle. For the arrangement of FIG. 4a it may, therefore, be required to provide specific means for "masking" the hot-spots, as also mentioned further above. If there are no geometric constrains in integration of the projector to the dashboard, this "masking" is not needed as the geometry of projector and screen will be chosen in a way that the hot-spot is not directed towards the viewer. A masking can be avoided if over the whole picture, the angle β is comprised between −110.6° and 0°. Corresponding position and image size depends on the projector throw ratio and/or geometry. The arrangement of FIG. 4a is preferred as the viewing angle and gain are within the specification according to FIG. 5 (gain/2=α×2) and thus the contrast of the image is better. The embodiment of FIG. 4b is operating within a region of smaller gain (flat section of curve in FIG. 5), which means that a higher luminance is needed.

FIG. 5 shows diagrams for explaining the important parameter "gain" with respect to a screen, e.g. the windshield 3 in FIG. 1, referring to the explanations further above. The gain measurements were carried out using a luminance meter, and a video projector. The luminance is measured at various observation angles for a given incidence angle of the projected light. The projection angle was set as close as possible to 0° (normal to the screen). When the projection angle is held fixed, the gain depends only on the observation angle θ. The luminance meter position is consequently adjusted so that when the observation angle is set to 0° in the horizontal plane, the luminance meter is aligned with specular reflection; the observation angle is therefore really equal to 0° as the specular direction is taken as the reference for observation angle measurement. Luminance measurements were carried out every five degrees 5° to 75° (measured in the horizontal plane) in an unlit environment isolated from any light source other than the video projector. A Spectralon measured under the same conditions was used to standardize the luminance measurements and to extract the gain therefrom. The intrinsic viewing angle α can be derived from these measurements as the full width half maximum of the gain curve and depicts the angular width for which the gain is superior to half the peak gain.

A maximum gain in the range of 0.1 to 0.8, preferably between 0.3 and 0.6 and an intrinsic viewing angle α for a real image element generated within the glazing surface of more than 60°, in a first direction and of more than 30°, in a second direction, perpendicular to the first direction can be for example obtained with a vehicle compound glazing unit comprising as diffusely reflecting structure a 70 μm thick textured PMMA sheet coated with a 60 nm thick $TiO_x$ based reflective coating and the following general stack sequence:

Clear glass 2.1 mm
Clear PVB 0.76 mm
Textured PMMA 70 μm
$TiO_x$ coating 60 nm
Clear PVB 0.76 mm
Clear glass 2.1 mm With heatable reflective coatings applied on a rough surface area, such as for example a textured PMMA sheet, similar optical properties can be obtained.

REFERENCE SIGNS

1 Vehicle compound glazing system, Vehicle glazing and display system
2 Vehicle compound glazing unit
4 first region
6, 6a, 6b 6c, 6d second region
8 bus bar
10 first pane
12 second pane
14 first interlayer
15 third interlayer
16 heatable layer, heatable coating
18 reflective coating
19 second interlayer
20 diffusely reflecting structure
22 heatable reflective coating
30 projector
32 dashboard
34 roof
100 vehicle
200 first occupant
201 second occupant

The invention claimed is:

1. A vehicle compound glazing unit with a first region and a second region comprising:
    a first pane having a first surface and a second surface,
    a second pane having a third surface and a forth fourth surface,
    a first interlayer from a thermoplastic polymer,
    wherein the first interlayer is arranged between the second surface of the first pane and the third surface of the second pane, and
    a heatable layer or coating arranged at the second surface of the first pane or the third surface of the second pane, the heatable layer or coating being provided with two or more electrical contacts, in particular bus bars,
    a diffusely reflecting structure in the second region, which diffusely reflects incident light directed to the glazing unit from an interior of the vehicle and having a maximum gain in a range of 0.1 to 0.8 and an intrinsic viewing angle α for a real image element generated within a glazing surface of more than 60°, in a first direction and of more than 30°, in a second direction, perpendicular to the first direction, wherein the intrinsic viewing angle α is an angular width measured at the full width half maximum (FWHM) of a peak around a maximum value of the gain independent of the value of the observation angle $\theta$ at a peak center and wherein the $\theta=0°$ reference for the gain curve measurement corresponds to a specular reflection direction.

2. The vehicle compound glazing unit according to claim 1, wherein the diffusely reflecting structure is a rough surface area of the third surface with a reflective coating.

3. The vehicle compound glazing unit according to claim 1, wherein the diffusely reflecting structure is a rough surface area of the second surface with a reflective coating.

4. The vehicle compound glazing unit according to claim 2, wherein the reflective coating fully covers the second surface or the third surface.

5. The vehicle compound glazing unit according to claim 2, wherein the heatable layer or coating and the reflective coating are implemented as a single heatable reflective coating.

6. The vehicle compound glazing unit (2) according to claim 1, comprising a second interlayer and a third interlayer, the second interlayer comprising the diffusely reflecting structure and a transparent region, and the third interlayer being made from a thermoplastic polymer, the second interlayer being sandwiched between the first interlayer and the third interlayer.

7. The vehicle compound glazing unit according claim 6, wherein the second interlayer comprises a PE, PET, TAC, PVB, PMMA or polycarbonate sheet.

8. The vehicle compound glazing unit according claim 6, wherein the diffusely reflecting structure comprises nanoparticles or microparticles, or a random nanostructure or a random microstructure.

9. The vehicle compound glazing unit according to claim 6, wherein the diffusely reflecting structure comprises a rough surface area of the second interlayer with a heatable reflective coating.

10. The vehicle compound glazing unit according to claim 1, wherein the first region is located in the middle of the vehicle compound glazing unit and the second region is located at an outer region of the vehicle compound glazing unit, surrounding partially or completely the first region.

11. The vehicle compound glazing unit according to claim 1, wherein the first pane is supposed to be arranged as outer pane and the second pane is supposed to be arranged as inner pane, wherein each of the first pane and second pane is made from glass or plastic.

12. The vehicle compound glazing unit according to claim 1, wherein the vehicle compound glazing unit is a glass roof, a windshield, a side window or a back window.

13. A vehicle compound glazing system (1) comprising a vehicle compound glazing unit according to claim 1 and at least one projector for projecting an image in the second region of the vehicle compound glazing unit to generate a real image in a plane of the vehicle compound glazing unit.

14. The vehicle compound glazing system according to claim 13, wherein the projector is suitable to be arranged in a dashboard and/or at a roof of the vehicle.

15. The vehicle compound glazing system (1) according to claim 13, comprising at least two projectors and a projector control unit connected to the at least two projectors and adapted to calibrate the projection of the image on a pixel base.

16. The vehicle compound glazing unit according to claim 1, wherein the maximum gain is between 0.3 and 0.6.

17. The vehicle compound glazing unit according to claim 10, wherein the second region is located along opposing edges of the vehicle compound glazing unit.

* * * * *